United States Patent [19]

Sartori et al.

[11] 3,932,369

[45] Jan. 13, 1976

[54] BLOCK COPOLYMERS CONTAINING OLEFIN SULFUR DIOXIDE SEGMENTS AND PROCESS FOR THEIR PREPARATION

[75] Inventors: Guido Sartori, Linden; Robert D. Lundberg, Somerville, both of N.J.

[73] Assignee: Exxon Research and Engineering Company, Linden, N.J.

[22] Filed: Nov. 6, 1974

[21] Appl. No.: 521,454

[52] U.S. Cl.... 260/79.3 A; 260/46.5 R; 260/46.5 H; 260/827; 260/836; 260/874; 260/878 B; 260/887; 260/897 R
[51] Int. Cl.$^2$................... C08F 28/00; C08G 75/22
[58] Field of Search...... 260/79.3 A, 878 B, 46.5 R, 260/46.5 H, 827, 836, 887, 874, 897 R

[56] References Cited
UNITED STATES PATENTS

| | | | |
|---|---|---|---|
| 2,310,605 | 2/1943 | Barnett | 260/79.3 A |
| 2,522,776 | 9/1950 | Busse | 260/79.3 A |
| 2,593,414 | 4/1952 | Crouch | 260/79.3 A |
| 2,625,525 | 1/1953 | Lynch | 260/79.3 A |
| 2,991,269 | 7/1961 | Nozaki | 260/878 B |
| 3,242,231 | 3/1966 | Graham et al. | 260/79.3 A |
| 3,313,785 | 4/1967 | Zutty | 260/79.3 A |
| 3,563,961 | 2/1971 | Pickle et al. | 260/79.3 A |
| 3,817,967 | 6/1974 | Mace et al. | 260/878 B |

*Primary Examiner*—Ronald W. Griffin
*Attorney, Agent, or Firm*—Robert J. Baran; Joseph J. Allocca

[57] ABSTRACT

The instant invention relates to novel block copolymers containing olefin sulfur-dioxide segments and a process for their preparation. The olefin of choice is a "strained" olefin thus capable of reaction with $SO_2$ in the presence of radicals at very high rates. Examples of strained olefins include cyclopropene, cyclobutene, norbornene, and the derivatives thereof. The novel block copolymers are prepared by contacting the olefin and the sulfur dioxide with a polymer under conditions of shearing degradation whereby said polymer is broken down into radical-containing segments which subsequently combine with the olefin and sulfur dioxide to form the novel copolymers described above. The polymer may be selected from the group consisting of polyisobutylene, poly(ethylene oxide), ethylene-propylene copolymers, poly(propylene oxide), polybutadiene, polyisoprene, etc. A novel block polymer formed by this preferred process shows improved properties as compared to physical mixtures of said polymer and olefin-sulfur dioxide copolymers. For example, the novel polymers formed by the preferred process of the instant invention show higher moduli and may be plasticized to higher levels while retaining good physical properties.

31 Claims, 5 Drawing Figures

BLOCK COPOLYMERS CONTAINING OLEFIN SULFUR DIOXIDE SEGMENTS AND PROCESS FOR THEIR PREPARATION

FIELD OF THE INVENTION

The instant invention relates to novel block copolymers containing olefin-sulfur dioxide segments and a process for their preparation. The olefin of choice is a strained olefin thus capable of reaction with $SO_2$ in the presence of radicals at very high rates. Examples of strained olefins include cyclopropene, cyclobutene, norbornene, and the derivatives thereof. Preferably, the olefin is selected from the group consisting of norbornene and its derivatives, e.g., 5-chloronorbornene, 7-chloronorbornene, 5-methyl-norbornene, 5-ethylnorbornene, 5-cyanonorbornene, norbornene-5,6-dicarboxylic acid anhydride, 5-hydroxymethyl-norbornene, 5-acetoxynorbornene, norbornene-5,6-dicarboxylic acid esters. The novel block copolymers are prepared by contacting the olefin and the sulfur dioxide with a polymer under conditions of shearing degradation whereby said polymer is broken down into radical-containing segments which subsequently combine with the olefin and sulfur dioxide to form the novel copolymers described above. The polymer may be selected from the group consisting of polyisobutylene, poly(ethylene oxide), ethylene-propylene copolymers, poly(propylene oxide), polybutadiene, polyisoprene, etc. A novel block polymer formed by this preferred process shows improved properties as compared to physical mixtures of said polymer and olefin-sulfur dioxide copolymers. For example, the novel polymers formed by the preferred process of the instant invention show higher moduli and may be plasticized to higher levels while retaining good physical properties.

BACKGROUND OF THE PRIOR ART

The copolymers of olefins and $SO_2$ are well known in the art. These polymers may be prepared by various processes, including bulk, solution and emulsion polymerization. These polymers have various uses, including as thickeners for crude oil, coatings, viscosity index improvers, etc.

U.S. Pat. No. 2,652,368 teaches the use of copolymers of $SO_2$ and olefins in lubricating oil compositions. These copolymers are prepared by the polymerization of a monomeric olefin and sulfur dioxide.

U.S. Pat. No. 3,442,790 teaches olefin sulfur dioxide copolymers as wax crystal modifiers. These materials are essentially alternating copolymers of a monomeric olefin and sulfur dioxide. The patentees note that there may be some homopolymerization of olefin taking place. This reference, however, does not teach the block copolymers of the instant invention.

U.S. Pat. No. 2,853,373 teaches the use of a copolymer of $SO_2$ and a $C_8$ to $C_{24}$ olefin. These materials are prepared by the copolymerization of the monomeric olefin and sulfur dioxide in a manner known in the art. Thus, this reference does not teach the block copolymer of the instant invention.

Dainton et al., J. Polymer Sci., 26, pages 351–64 (1957); 29, pages 549–56 (1958) teach polymers formed from the monomeric olefin and $SO_2$. These materials, since they are prepared by monomeric olefins, are unlike the block copolymers of the instant invention.

In U.S. Pat. Nos. 3,409,548; 3,396,115; and British Pat. No. 1,258,758 copolymers of olefins and sulfur dioxide are taught as useful in oil-based fracturing fluids; dry cleaning solvents; and coatings, respectively. All these materials are prepared by the copolymerization of sulfur dioxide and a monomeric alpha-olefin. Thus, they are unlike the compositions of the instant invention.

U.S. Pat. No. 3,563,961 teaches a process for the preparation of terpolymers of alpha-olefin, sulfur dioxide and monoolefinically unsaturated carboxylic acid chlorides or monoolefinically unsaturated dicarboxylic anhydrides. These polymers are not characterized as block copolymers, since they are prepared from mixtures of the respective monomers.

Crawford et al., J. Appl. Poly Sci., 15, pages 1881–1888 (1971) teach copolymers of alpha-olefins and sulfur dioxide. In the preparation utilized in this paper, the olefin was added slowly to liquefied sulfur dioxide. Thus, the resulting copolymer was not the block copolymers of the instant invention.

In U.S. Pat. 3,728,185, the use of olefin sulfur dioxide copolymers as bonding agents for finely divided inorganic fusible or sinterable material is disclosed. The olefin-sulfur dioxide copolymer is prepared by methods known in the art, that is, the copolymerization of monomeric olefins and sulfur dioxide in the presence of free radical catalysts or ultraviolet light. These materials, since they are prepared from mixtures, including monomeric olefins, do not have the block copolymer structure of the compositions of the instant invention. In German Application 2,308,415 and netherlands Application 73,02322, copolymers of two monoolefins and sulfur dioxide are taught. These materials are prepared from mixtures of the monomeric olefin, thus block copolymers similar to those of the instant invention are not taught.

U.S. Pat. 3,313,785 claims block copolymers of olefin-$SO_2$ and a free radical polymerizable monomer, e.g., vinyl chloride, ethyl acrylate, etc. are prepared by adding said monomer to a "living" polymer prepared by the auto initiated copolymerization of the olefin and $SO_2$. The teachings of this reference have been refuted by G. Sartori et al. in Polymer Letters, Vol. 10, pages 583–592 (1972). The disclosure of this patent differs from the instant process in that it does not teach the generation of free radical containing segments by use of shear, which are utilized in initiating the polymerization of an added monomer. Furthermore, since the patentee teaches a free radical polymerization mechanism, there is no disclosure of how to make block copolymers containing monomers which do not undergo free radical polymerization, e.g., isobutene, ethylene oxide, etc.

The novel block copolymers of the instant invention may be used in all of the applications described for olefin-$SO_2$ polymers above. However, as will be apparent to the skilled artisan the properties of the novel copolymers described below may provide more or less effective use in said applications.

SUMMARY OF THE INVENTION

It has now been unexpectedly discovered that novel block copolymers may be prepared by subjecting a polymer to shearing agitation at conditions whereby said polymer breaks down into free radical bearing segments, in the presence of an olefin and sulfur dioxide. The olefin and sulfur dioxide combine with the free radicals thus formed to form block copolymers wherein blocks of the original polymer alternate with blocks of an olefin sulfur dioxide segment.

The olefin is characterized as a strained olefin and may be selected from the group consisting of cyclopropene, cyclobutene, norbornene, and derivatives thereof. Preferably, the olefin is norbornene, or a derivative thereof, e.g., 5-chloronorbornene, 7-chloronorbornene, 5-methylnorbornene, 5-ethyl-norbornene, 5-cyanonorbornene, norbornene-5,6-dicarboxylic acid anhydride, 5-hydroxymethyl-norbornene, 5-acetoxynorbornene, norbornene-5,6-dicarboxylic acid esters. Most preferably the olefin is norbornene. A strained olefin is defined as a cis cycloolefin having a ring strain of at least about 4 kilocalories per mole as compared to a corresponding open chain structure. See, for example, Polymer Chemistry of Synthetic Elastomers, edited by J. P. Kennedy and E. Tornqvist, Interscience Publishers, 1968, especially Table VIII on page 720.

The polymer may be selected from those known in the art which can, by means of shear, be converted into radical bearing segments. These materials will preferably have a number average molecular weight of at least 100,000, more preferably from 500,000 to 5,000,000, most preferably 1,000,000 to 4,000,000. The polymer may be a homo- or copolymer composition. Nonlimiting examples of these polymeric materials include polyisobutene, poly(ethylene oxide), poly(propylene oxide), ethylene-propylene copolymers, polybutadiene, polyisoprene, etc. In general, the polymer will be selected in view of the properties it will impart to the novel block copolymers of the instant invention, e.g., hydrophilicity or hydrophobicity. For convenience, since the polymer of choice must be dissolved in the olefin or in an inert solvent, as further described below, noncrystalline polymers are preferred. Preferably, the polymer may be selected from the group consisting of polyisobutylene and polyethylene oxide.

The process of the instant invention is especially useful for preparing novel block copolymers wherein one or more segments is an olefin-$SO_2$ polymer block and one or more segments is a polymer block made up of monomers which do not undergo free radical polymerization. Examples of these polymer blocks include polyisobutylene; polyethylene oxide; polypropylene oxide; polypentenamer; 1,4-cis-polybutadiene; 1,4-cis-polyisoprene; polyalkyl vinyl ethers, e.g. polyisobutyl vinyl ether; polysiloxanes, e.g., polydimethylsiloxane; and copolymers of ethylene and propylene.

The process of the instant invention may be run in a solvent or in the olefin monomer, alone, provided the polymer is at least partly soluble in the reaction mixture without addition of a solvent.

The solvent may be selected, by those skilled in the art, on the basis of its ability to dissolve the polymer and its nonsusceptibility to reaction with the materials present during the process of the instant invention, that is, the solvent should be inert to combination or degradation by the olefin or sulfur dioxide reactants and should not react with free radicals. The solvent may be selected from the group consisting of paraffinic, cycloparaffinic and inert aromatic hydrocarbons, ring-chlorinated aromatic hydrocarbons, nitrogen and oxygen-containing hydrocarbon derivatives, e.g., acetonitrile, etc. In general, these materials should be substantially saturated so that they will not combine with $SO_2$ or the olefin or trap the radicals formed in the process of the instant invention. Many aromatic solvents may be used, however, since their unsaturation is basically inert at the conditions of the process of the instant invention, but certain aromatics will react with and trap radicals. Thus, toluene and xylene are preferably not used.

It will be obvious to the skilled artisan that the process of the instant invention, being a free radical process, will be run under an inert atmosphere, e.g., nitrogen, argon, etc. or the reactants, especially the sulfur dioxide, themselves, may provide the atmosphere.

The polymer which is to be utilized in the process of the instant invention may be mixed with other polymers or used alone. For example, the process of the instant invention is applicable to the combination of norbornene and sulfur dioxide with polyisobutylene alone or in combination with polybutadiene, polyisoprene, ethylene-propylene copolymers, poly(ethylene oxide), etc. The process of the instant invention, because of its ability to utilized a broad spectrum of polymeric material, leads to great flexibility in designing new polymers. For example, physical mixtures of starting polymers after combination with olefins and sulfur dioxide, under the conditions of the process of the instant invention, may comprise a triblock copolymer wherein one block is the olefin-sulfur dioxide segment, while each of the other blocks is a different polymeric material, for example, polyisobutene-(norbornene-$SO_2$ copolymer block)-poly(ethylene oxide).

In the process of the instant invention, it is critical that an adequate amount of shear be imparted to the polymer so as to break down the polymer into radical bearing segments. The amount of shear in each case will vary according to the strength of the chemical bonds present in the backbone of said polymer. In general, the greater the intensity of the shear, the more likely the polymer will break down into free radical bearing segments. The amount of shear which can be imparted to a polymer is dependent on various parameters. For example, it is important that the viscosity of the polymer or the polymer containing solution be sufficient to enable the skilled artisan to provide the necessary shear with apparatus known in the art. In general, this viscosity will be dependent on the concentration of the polymer and the molecular weight thereof. The viscosity will also vary with the particular polymer used. However, the skilled artisan may easily adjust the above parameters to obtain an adequate rate of free radical formation.

The process of the instant invention is substantially dependent on time and temperature as well as the amount of shear imparted to the polymer. Thus, extended times of shearing and lower temperatures give rise to block polymers which incoporate greater amounts of olefin-sulfur dioxide in the block. In general, the process will be run at a temperature of from −80 to 100°C., more preferably from −60 to 40°C. The shear is applied to the polymer for a time of at least 0.5 minutes, more preferably from 0.5 minutes to 10 minutes. The amount of olefin which is added in the process of the instant invention is dependent on its concentration during the shearing of the polymer. In general, from 1 to 80 wt. %, more preferably from 10 to 50 wt. % olefin based on starting polymer weight may be combined with said polymer. The amount of sulfur dioxide incorporated is dependent on the olefin. In general, the sulfur dioxide incorporates with the olefin on a 1:1 molar ratio. Sulfur dioxide may be conveniently provided by saturating the mixture of a polymer and olefin, with or without solvent, by the sulfur dioxide. Alternatively, the sulfur dioxide can be passed through said mixture during the shearing of the polymer olefin solution. Finally, the sulfur dioxide can be present in an atmosphere above said solution during the shearing thereof.

After the block copolymers of the instant invention are formed according to the description above, the material is generally separated from the reaction mixture for use. This is conveniently done by means known in the art. For example, unreacted olefin and solvent may be removed by distillation. The polymer can be reprecipitated from various solvents in order to obtain pure materials. In general, it will be found that after reaction the mixture will contain unreacted starting polymer, block copolymers of the starting polymer and an olefin-sulfur dioxide segment, and essentially pure olefin-$SO_2$ copolymer. These materials will be present in varying amounts, dependent on the conditions of the reaction. It should be noted that this material can be used as is, or the individual components separated for use. It has been found that unexpectedly the block copolymer in admixture with the various polymeric components described above show improved properties as compared to physical mixtures of the starting polymer and the copolymer of the olefin and the sulfur dioxide. For example, when compared at equal levels of sulfur dioxide, the compositions of the instant invention show higher moduli as compared to the physical mixtures of the polymers. Additionally, these materials show improved properties when plasticized with various high boiling liquids.

BRIEF DESCRIPTION OF THE DRAWINGS

The figures compare the stress-strain properties of products obtained by shearing polyisobutene in the presence of norbornene and $SO_2$ with those of physical mixtures of similar composition.

In a preferred embodiment, which is intended to be illustrative only, to polyisobutylene having a molecular weight of about $4 \times 10^6$ and dissolved at a level of 5 grams in 100 ml of n-heptane is added 20 ml of liquid sulfur dioxide at a temperature of 0°C. Ten grams of norbornene dissolved in 10 ml of n-heptane is added and this mixture is agitated at 10,000 rpm for 5 minutes. The agitation is terminated and a block copolymer of polyisobutylene and norbornene-sulfur dioxide is isolated by precipitating in methanol. This material is found to have incorporated 7.2 wt. % sulfur. On this basis, the material is compared to a physical mixture of polyisobutylene and a norbornene sulfur dioxide copolymer at equal levels of sulfur. It is found that the block copolymer shows substantially greater modulus as compared to the physical mixture described.

Figure 1:
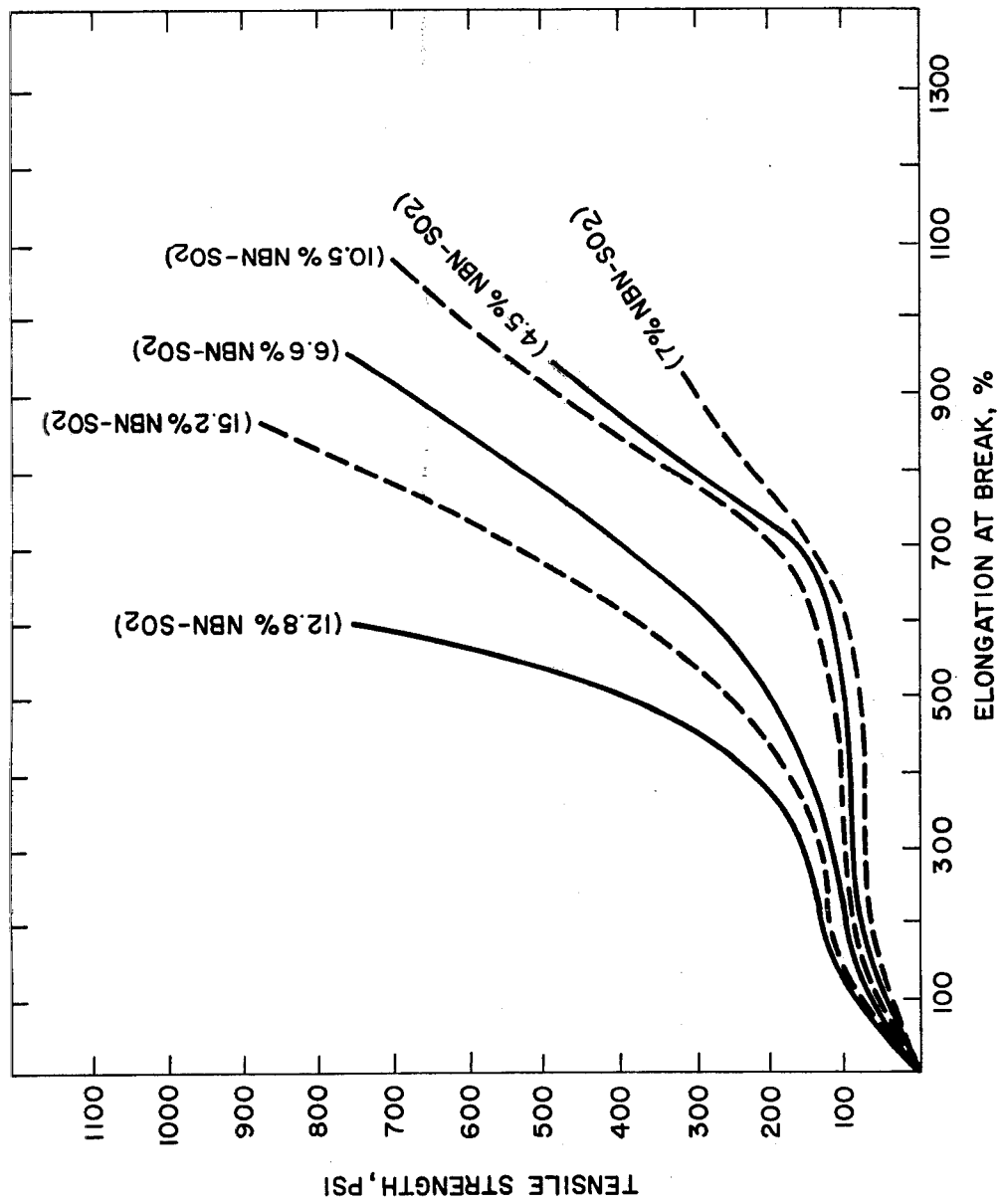

The following are specific embodiments of the instant invention.

EXAMPLE 1

A 400-ml flask having two ball-joint necks at 45° from one another, a three-way stopcock inserted in one of the necks for the introduction of reagents under an inert atmosphere; and a thermometer in the other neck was used in the experiments. 5 g of polyisobutene was dissolved in 100 ml of heptane under slow magnetic stirring. When dissolution was complete, the magnetic bar was removed inside a dry box while sweeping the flask content with nitrogen. A homogenizer stirrer was inserted. 20 ml of heptane solution containing 10 g of norbornene was then added and the flask cooled with ice water. When the temperature reached 10°C., 20 ml of liquid $SO_2$ was added, while stirring at minimum speed. At the end of the addition the temperature had dropped to $-8$°C. The stirring speed was increased to 10,000 rpm and kept there for 5 minutes. After termination of the shearing, the flask was filled with benzene containing hydroquinone and then the contents of the flask poured into 1 liter of deaerated methanol to coagulate the polymer. The mother liquor was discarded, 100 ml of deaerated chloroform was added and the mass stirred very slowly until dissolution was complete. The polymer was reprecipitated by filling the flask with methanol and dried in vacuo at 50°C. The polymer weight was 5.8 g. Taking into account that about 0.1 g of polyisobutene was lost during the removal of the magnetic bar, the weight of the norbornene-$SO_2$ component was 0.9 g, corresponding to 15.5% of the crude product. Based on the sulfur analysis, the norbornene-$SO_2$ content was 15.15%, in good agreement with the calculated value.

The experiment was repeated without degradation, i.e. by slowly stirring the reaction mixture and no increase in weight of the polymer was observed. Therefore no norbornene-$SO_2$ copolymerization had occurred. This was confirmed by the fact that the sulfur content of the raw reaction product was only 0.04%.

EXAMPLE 2

5 g of polyisobutene was dissolved in 100 ml of chlorobenzene, using slow magnetic stirring, as described in Example 1. When dissolution was complete, the magnetic bar was removed and the homogenizer stirrer was inserted. 20 ml of a chlorobenzene solution containing 10.5 g of norbornene was added. The flask was cooled in ice water. When the temperature reached 10°C., 22 ml of liquid $SO_2$ was added while stirring at minimum speed. At the end of the addition the temperature had dropped to 3°C., the nitrogen stream was replaced by $SO_2$, then the stirring speed was brought to 10,000 rpm and kept there for 20 minutes, during which time the temperature climbed to 11°C. The $SO_2$ stream was replaced by nitrogen, then the flask was filled with benzene containing hydroquinone. The mass was poured into 1 liter of deaerated methanol, the polymer precipitated. After discarding the mother liquor by siphonation, the polymer was dissolved in 300 ml of deaerated chloroform while stirring very slowly, then reprecipitated with methanol. After drying in vacuo the weight was 5.7 g. Taking into account that about 0.1 g of polyisobutene was lost during the removal of the magnetic bar, the weight of the norbornene-$SO_2$ component was .8 g, corresponding to 14% of the crude product. Based on the sulfur analysis, the norbornene-$SO_2$ content was also 14% therefore in very good agreement with the calculated value.

If the experiment was repeated without degradation, i.e. by slowly stirring the reaction mixture, no copolymerization of norbornene with $SO_2$ was observed.

EXAMPLES 3–19

In Table 1 the results of shearing polyisobutene (PIB) in the presence of norbornene-(NBN) $SO_2$ at other conditions are given.

Figure 2:
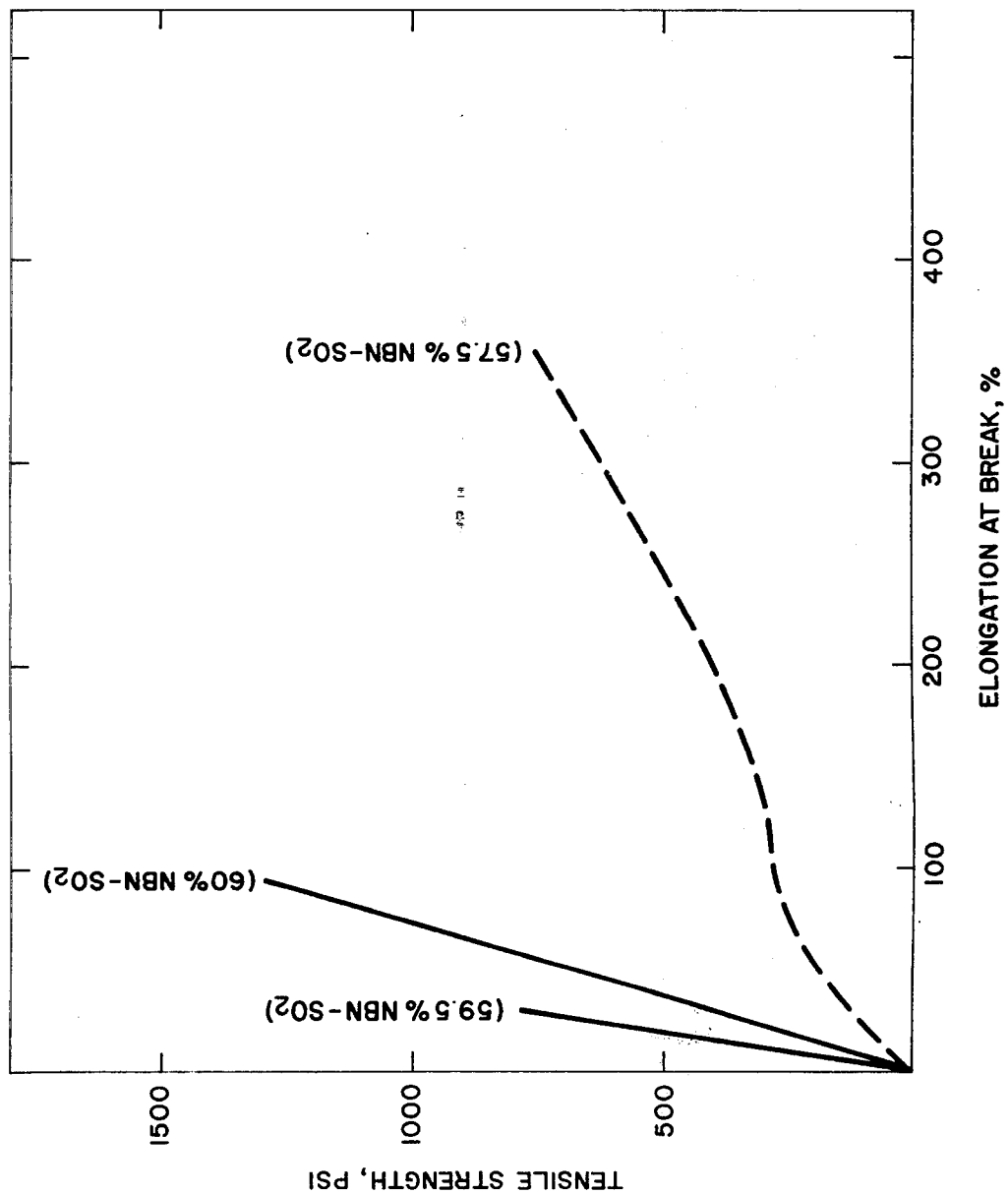
Figure 3:
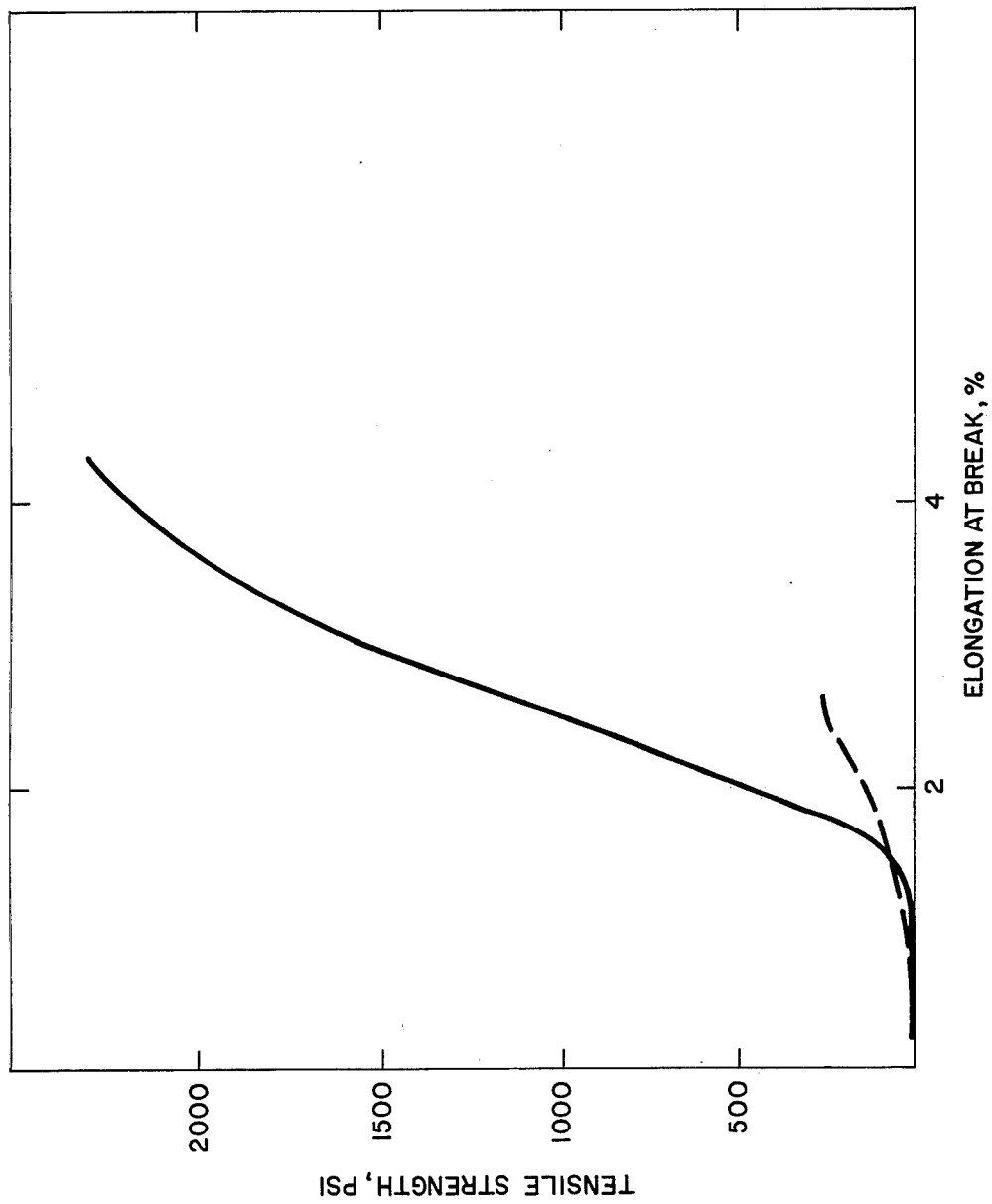
Figure 4:
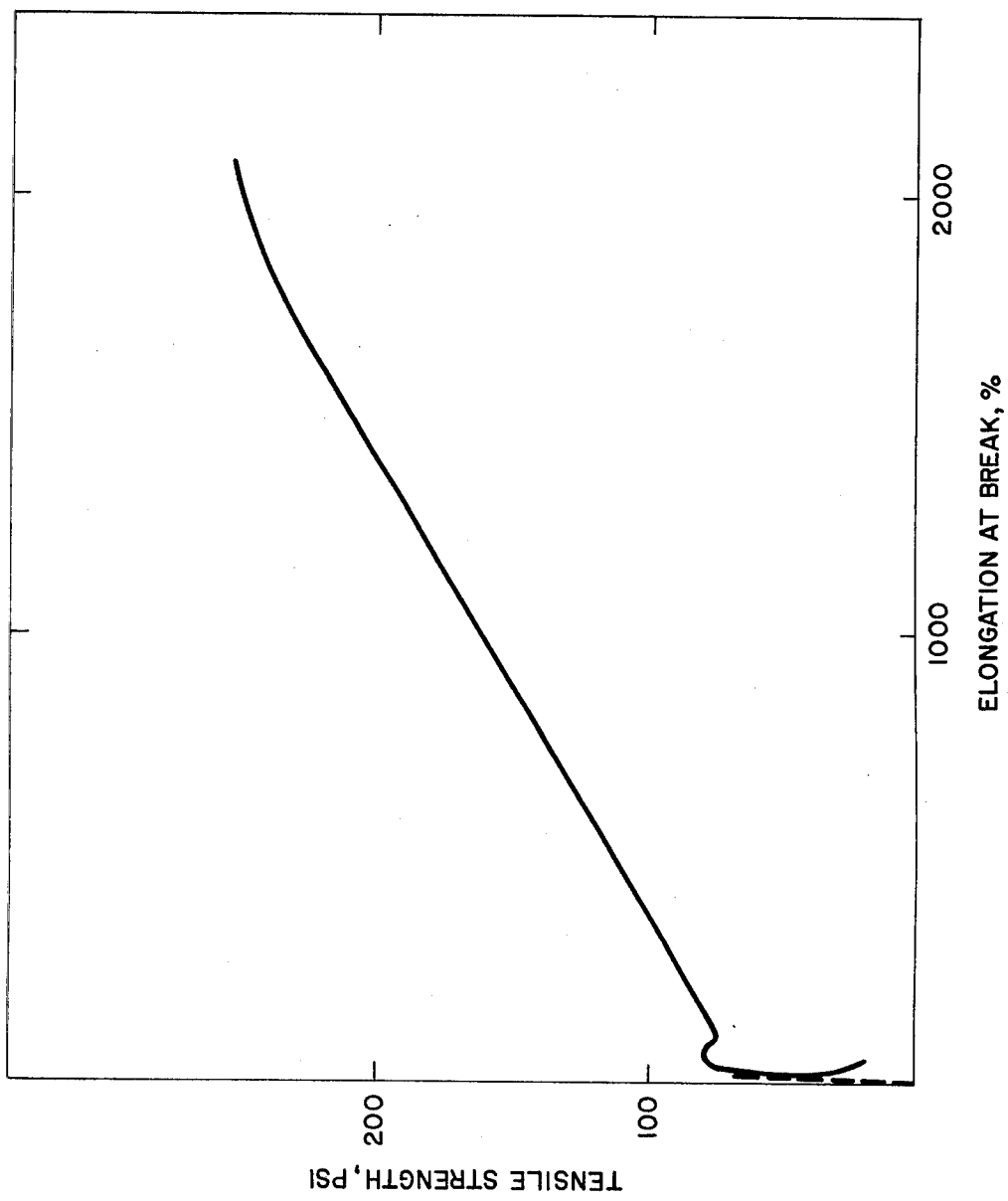
Figure 5:
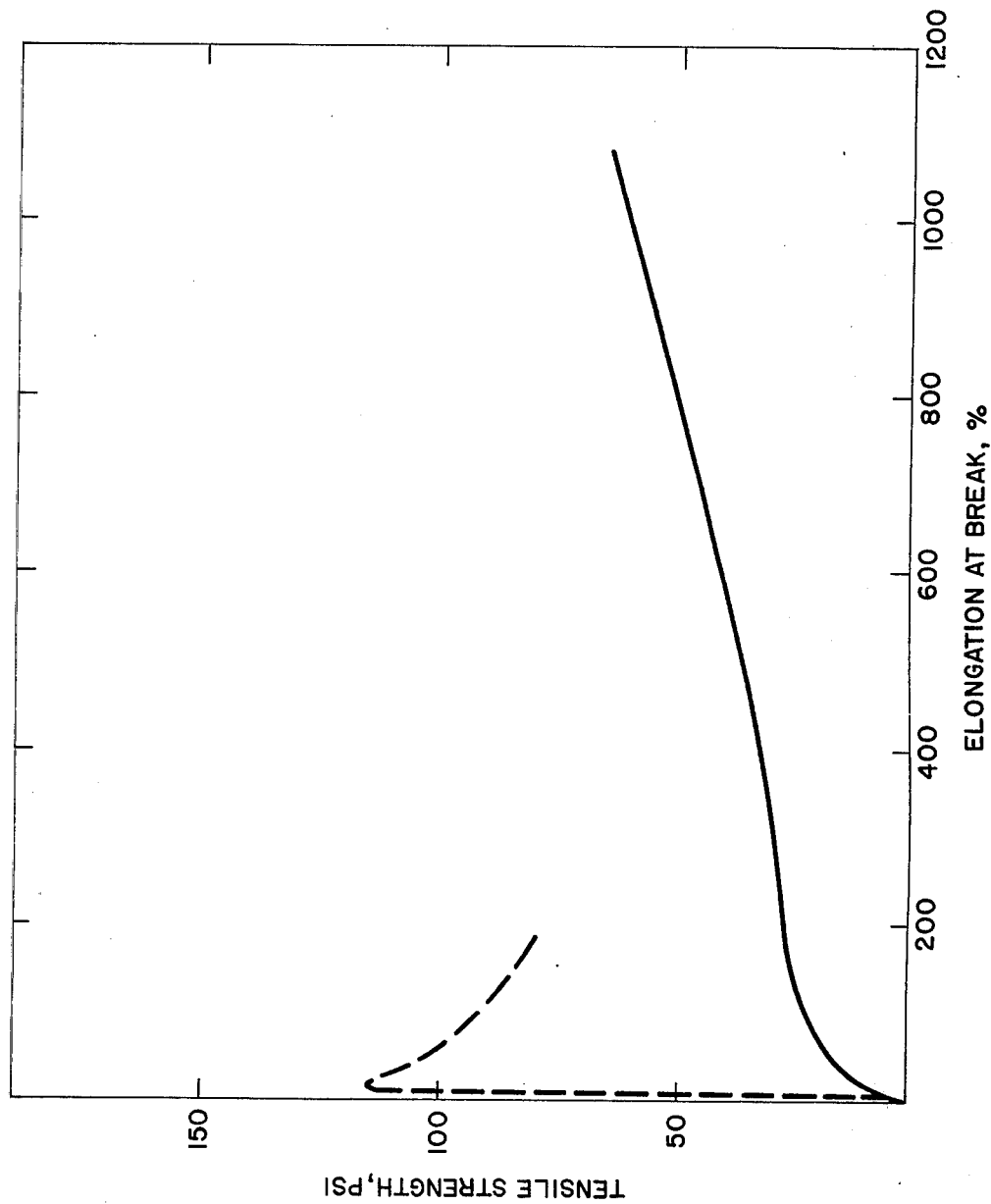

In FIGS. 1 and 2 stress-strain properties of products obtained by shearing polyisobutene in the presence of norbornene and $SO_2$ are compared to those of physical mixtures of similar composition. It is clear that the